(12) United States Patent
Bacallao

(10) Patent No.: US 10,618,540 B2
(45) Date of Patent: Apr. 14, 2020

(54) SHOPPING CART AND METHOD OF ASSEMBLING A SHOPPING CART

(71) Applicant: Walmart Apollo, LLC, Bentonville, AR (US)

(72) Inventor: Yurgis Mauro Bacallao, Centerton, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 110 days.

(21) Appl. No.: 15/935,536

(22) Filed: Mar. 26, 2018

(65) Prior Publication Data

US 2018/0281836 A1   Oct. 4, 2018

Related U.S. Application Data

(60) Provisional application No. 62/481,231, filed on Apr. 4, 2017.

(51) Int. Cl.
*B62B 3/02* (2006.01)
*B62B 3/14* (2006.01)
*B62B 3/00* (2006.01)

(52) U.S. Cl.
CPC .............. *B62B 3/027* (2013.01); *B62B 3/004* (2013.01); *B62B 3/1484* (2013.01); *B62B 2203/10* (2013.01); *B62B 2205/06* (2013.01); *B62B 2206/06* (2013.01)

(58) Field of Classification Search
CPC ......... B62B 3/1484; B62B 3/004; B62B 3/04; B62B 3/02; B62B 3/005; B62B 2205/06; B62B 5/0003
See application file for complete search history.

(56) References Cited

U.S. PATENT DOCUMENTS

| | | | | |
|---|---|---|---|---|
| 3,806,187 A * | 4/1974 | Bull | ......................... | B60J 7/068 296/100.09 |
| 3,815,932 A * | 6/1974 | Ruger | ..................... | B62B 3/148 280/33.995 |
| 3,863,985 A * | 2/1975 | Zuber | ....................... | B62B 3/02 298/2 |

(Continued)

FOREIGN PATENT DOCUMENTS

DE   10118620 A1   1/2003
KR   200442301 Y1   10/2008

*Primary Examiner* — Emma K Frick
(74) *Attorney, Agent, or Firm* — Schmeiser, Olsen & Watts LLP; Karen E. Jachimowicz

(57) ABSTRACT

Described is a shopping cart used to collect items in a retail store and transport them throughout the store and/or to a customer's vehicle. The shopping cart is configured to make it easier to load and unload heavy and awkward items. The shopping cart has a shopping cart basket and a support structure supporting the shopping cart basket above a wheel assembly. A front panel of the shopping cart basket rolls on wheels and tracks to a position above the basket or below the shopping basket. The shopping cart also has a lifting mechanism for raising and lowering the shopping cart basket. A customer can raise or lower the shopping cart basket and slide the front panel out of the way, if needed, for easy loading and unloading of the shopping cart. These features make it easier for the customer to load and unload heavy and awkward items.

7 Claims, 11 Drawing Sheets

(56) References Cited

U.S. PATENT DOCUMENTS

| | | | |
|---|---|---|---|
| 4,007,809 A * | 2/1977 | Goransson | B62B 3/1484 |
| | | | 186/63 |
| 4,222,579 A * | 9/1980 | Frydendal | B62B 3/186 |
| | | | 280/33.996 |
| 5,322,143 A | 6/1994 | Curran | |
| 5,385,358 A * | 1/1995 | Adamson | B62B 3/148 |
| | | | 280/33.995 |
| 6,193,246 B1 * | 2/2001 | Ondrasik | B62B 3/148 |
| | | | 280/33.995 |
| 6,409,186 B2 | 6/2002 | Bennington | |
| 6,431,319 B1 * | 8/2002 | Myers | B62B 3/02 |
| | | | 187/243 |
| 7,080,844 B2 | 7/2006 | Espejo | |
| 8,172,255 B1 * | 5/2012 | Martin | B62B 3/04 |
| | | | 187/244 |
| 8,465,103 B2 | 6/2013 | Burt et al. | |
| 8,474,896 B2 * | 7/2013 | Ostberg | B62D 33/0273 |
| | | | 296/100.02 |
| 8,764,031 B2 * | 7/2014 | Finstad, III | A47B 57/06 |
| | | | 211/187 |
| 9,045,321 B2 | 6/2015 | Ford et al. | |
| 9,050,986 B2 * | 6/2015 | Jarvi | B62B 3/002 |
| 2006/0006726 A1 | 1/2006 | Garvey | |
| 2010/0066043 A1 * | 3/2010 | Tyrrell | B62B 3/102 |
| | | | 280/33.992 |

* cited by examiner

US 10,618,540 B2

SHOPPING CART AND METHOD OF ASSEMBLING A SHOPPING CART

CROSS REFERENCE TO RELATED APPLICATION

This invention claims priority to U.S. provisional patent application Ser. No. 62/481,231, filed Apr. 4, 2018 entitled "Shopping Cart and Method of Forming a Shopping Cart", each of which are incorporated entirely herein by reference.

BACKGROUND OF THE INVENTION

Technical Field

This invention relates to shopping carts, and specifically to a shopping cart with a front panel that slides out of the way to make loading and unloading the cart easier.

State of the Art

Shopping carts are wheeled carts used in retail stores to carry purchases while shopping and to a customer's vehicle. Shopping carts have a shopping basket that holds items to be purchased, supported by a wheeled support structure. It can be difficult for a customer to put heavy or awkward items into and out of the shopping cart basket by lifting the items over the sides of the shopping basket.

Accordingly, what is needed is a shopping cart that can be raised and lowered to facilitate loading and unloading. Also needed is a shopping cart where one of the sides of the shopping baskets can be moved out of the way so heavy items can be slid in and out of the shopping basket.

DETAILED DESCRIPTION OF EMBODIMENTS OF THE INVENTION

As discussed above, embodiments of the present invention relate to shopping carts, and specifically to a shopping cart with a lift device that raises and lowers the shopping basket, and a front panel that slides out of the way to make loading and unloading the cart easier.

Disclosed is a shopping cart used to collect items in a retail store and transport them throughout the store and/or to a customer's vehicle. The shopping cart is configured to make it easier to load and unload heavy and awkward items. The shopping cart has a shopping cart basket, a handle, a support structure supporting the shopping cart basket, and a wheel assembly. The shopping cart has a front panel of the basket that rolls on wheels and tracks to a position above the basket or below the basket. This rolling of the front panel assembly on tracks gets the front panel out of the way so that items in the cart may be slid into or out of the shopping cart basket through the front of the basket. The shopping cart also has a lifting mechanism for raising and lowering the shopping cart basket. The lifting mechanism raises and lowers the shopping cart basket to make it easier to load or unload the shopping cart basket. A customer can raise or lower the shopping cart basket for easy loading and unloading of the shopping cart. And the front panel of the shopping cart basket can be moved out of the way above or below a bottom panel of the shopping basket so that items can be moved into or out of the shopping basket through a front side of the shopping basket. Both of these features of the shopping cart make it easier for the customer to load heavy and awkward items into and out of the shopping cart.

Figure 1:
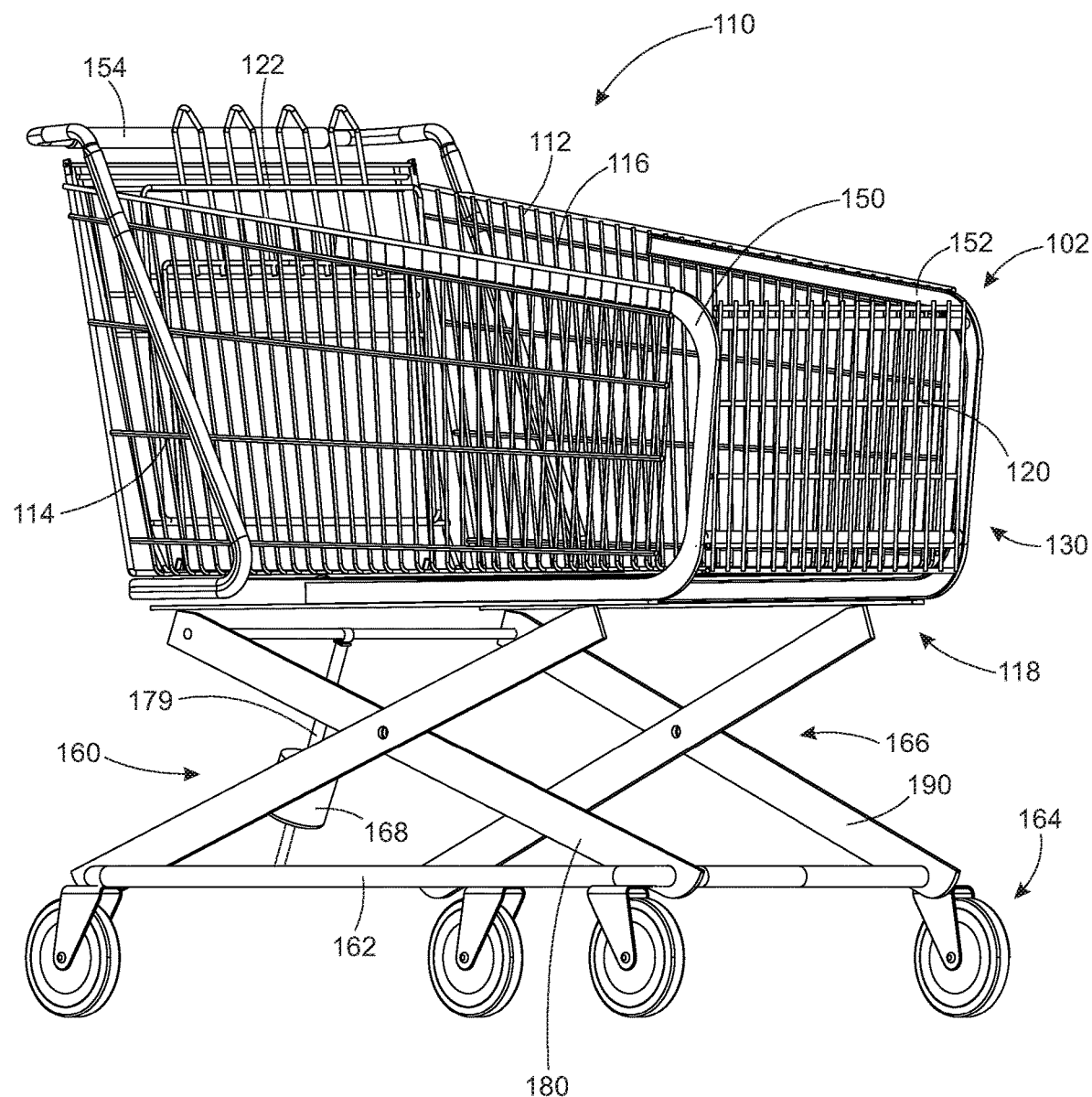
FIG. 1 shows a side perspective view of a shopping cart.
Figure 2:
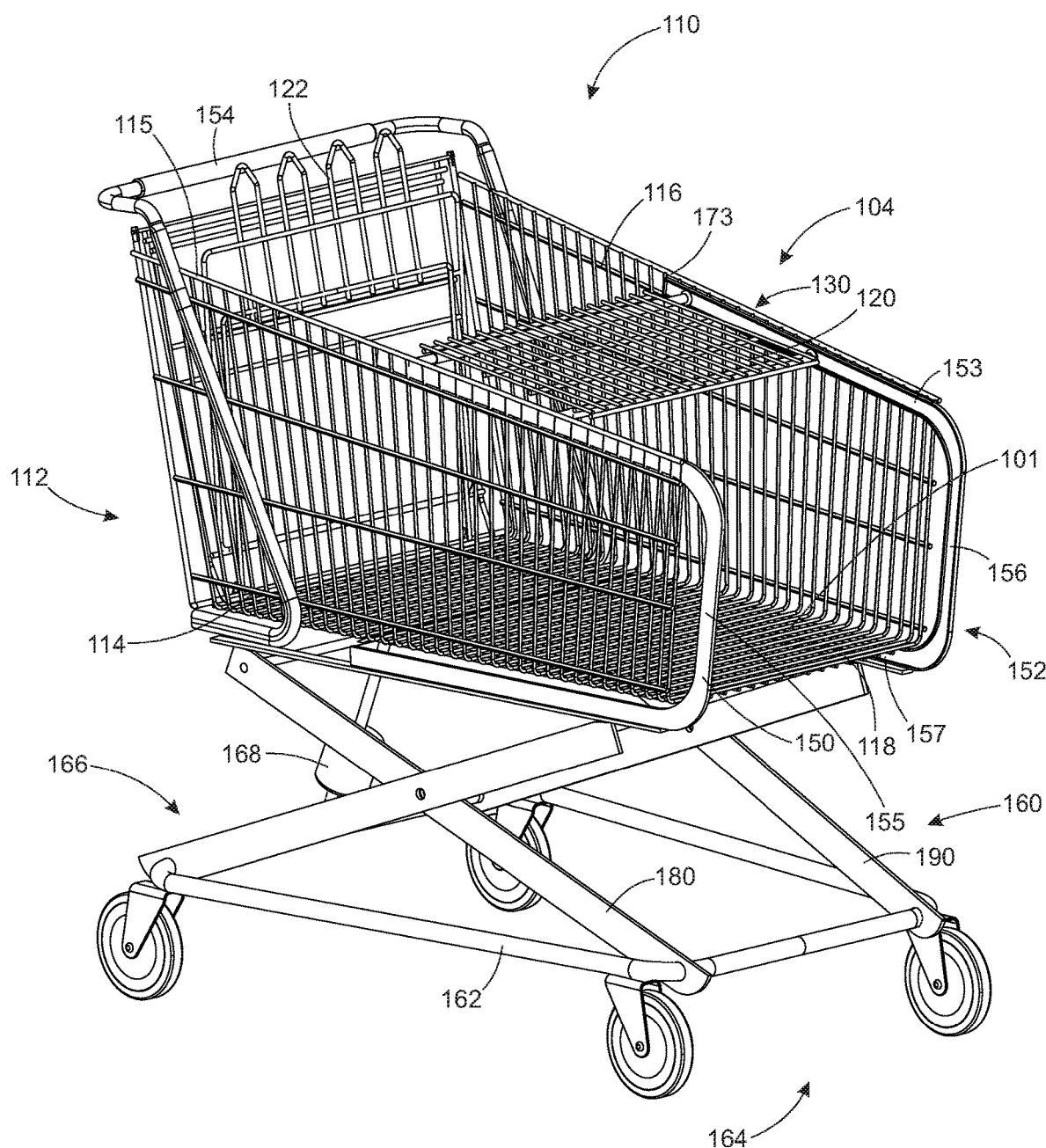
FIG. 2 shows a top perspective view of the shopping cart of FIG. 1, with a front panel of the shopping cart moved to a position above the shopping basket and above a bottom panel of the shopping basket.
Figure 3:
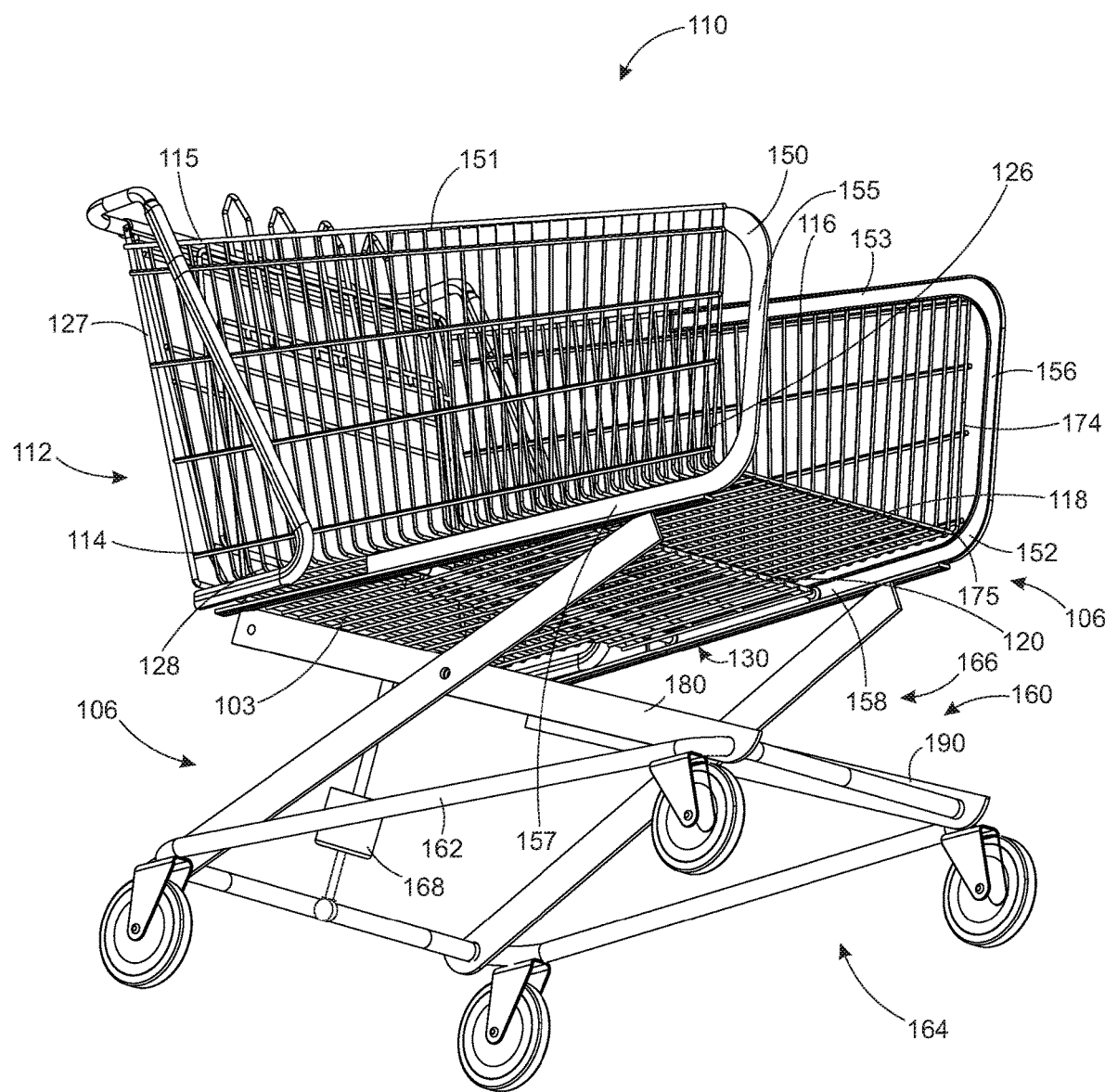
FIG. 3 shows a bottom perspective view of the shopping cart of FIG. 1, with a front panel of the shopping cart moved to a position below the shopping basket and below the bottom panel of the shopping basket.

FIG. 1 through FIG. 3 show perspective views of a shopping cart 110. Shopping cart 110 is used by customers of a retail store to carry items to be purchased. Shopping cart 110 includes a shopping basket 112 for carrying items. Shopping cart 110 also includes a support structure 160 that supports shopping basket 112 above a wheel assembly 162 with a set of wheels 164. Shopping cart 110 rolls along the ground on set of wheels 164 of wheel assembly 162. Support structure 160 is coupled to wheel assembly 162 and shopping basket 112, and supports shopping basket 112 above support structure 160. A handle 154 is used to push shopping cart 110.

Shopping cart 110 is different from other shopping carts because it includes a front panel assembly 130 that slides on a first and a second wheel track 150 and 152, and it includes a lifting mechanism 166 that raises and lowers shopping basket 112. Both moveable front panel assembly 130 and lifting mechanism 166 make it easier and safer to load heavy or awkward items onto and out of shopping cart 110. Front panel assembly 130 slides on tracks 150 and 152 to a first position 104 above shopping basket 112 (shown in FIG. 2), and a second position 106 below shopping basket 112 (shown in FIG. 3). First position 104 above shopping basket 112 means that front panel assembly 130 is closer to a bottom panel top side 101 of a bottom panel 118 than a bottom panel bottom side 103 of bottom panel 118. In first position 104, front panel assembly 130 is approximately parallel to bottom panel top side 101. Second position 106 below shopping basket 112 means that front panel assembly 130 is closer to bottom panel bottom side 103 of bottom panel 118, than bottom panel top side 101 of bottom panel 118. In second position 106, front panel assembly 130 is adjacent to, and approximately parallel to, bottom panel bottom side 103. When front panel assembly is in first or second position 104 or 106, items may be slid into or out of shopping basket 112 through the front. This is easier than lifting items over the sides of shopping basket 112. Lifting mechanism 166 lifts shopping basket 112 up or down, so that items do not need to be lifted or lowered by hand, but can be lifted or lowered using shopping basket 112. These features of shopping cart make it easier for customers to load items into and out of shopping cart 110.

Shopping basket 112 is a basket formed of a first and a second side panel 114 and 116, bottom panel 118, a rear panel 122, and front panel assembly 130. Front panel assembly 130 includes a front panel 120. In its default position 102 as shown in FIG. 1, front panel assembly closes the front end of shopping basket 112. Shopping cart 110 includes first wheel track 150 coupled to first side panel 114, and second wheel track 152 coupled to second side panel 116, as shown in FIG. 1 through FIG. 3. Front panel assembly 130 rolls on wheels along first and second track 150 and 152 to move front panel assembly 130 between first position 104 as shown in FIG. 2, default position 102 as shown in FIG. 1, and second position 106 as shown in FIG. 3. In default position 102 as shown in FIG. 1, front panel assembly 130 is in a position as the front side to shopping basket 112. In first position 104 as shown in FIG. 2, front panel assembly 130 and front panel 120 are above shopping cart 112 and bottom panel 118 so that items in shopping basket 112 can be slid into and out of shopping basket 112 through the front side. In situations where having front panel assembly 130 above shopping basket 112 would put front panel assembly 130 in the way of a customer's activities, front panel assembly 130 can move to second position 106 as shown in FIG. 3, which puts front panel assembly 130 and front panel 120 below shopping basket 112 and bottom panel 118, as shown in FIG. 3.

Figure 4:
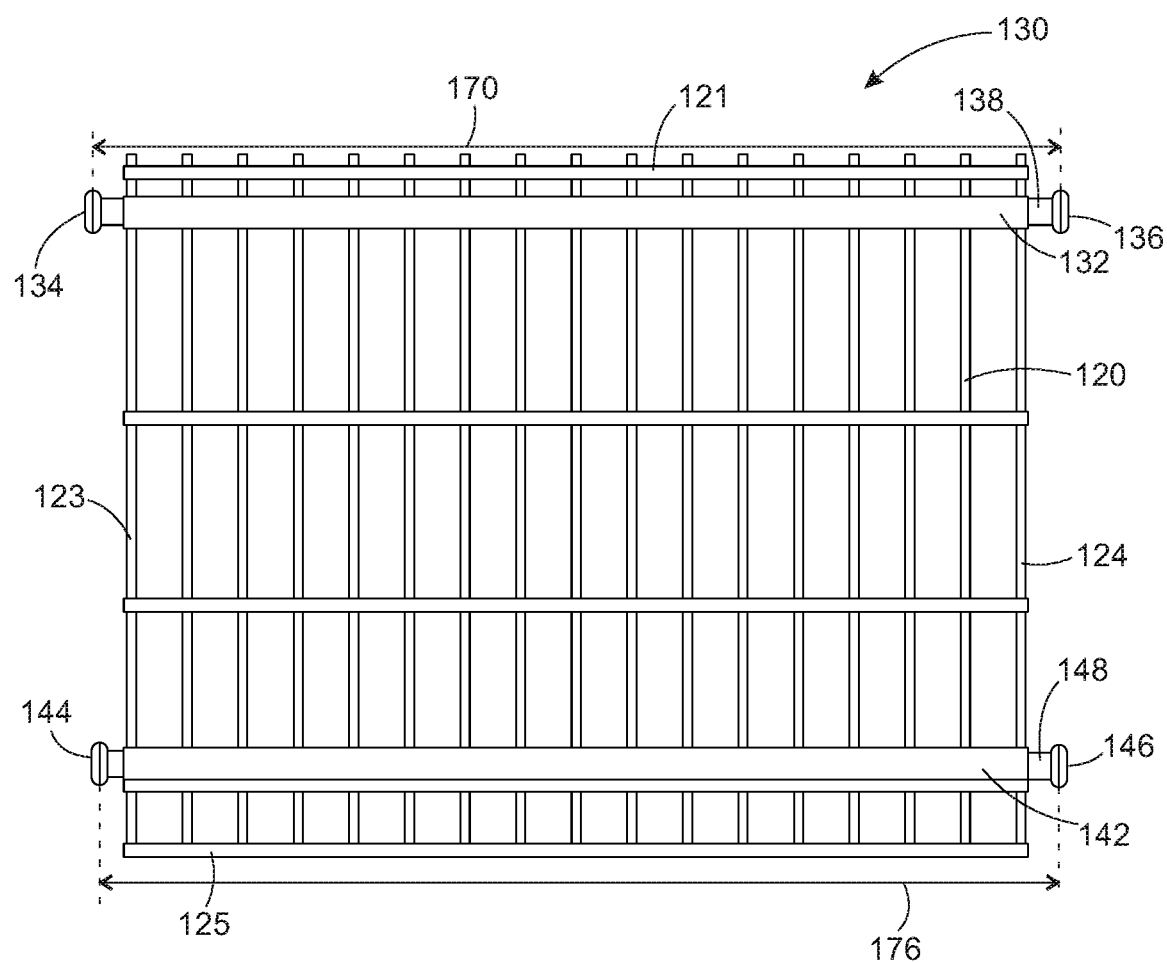
FIG. 4 shows a front view of a front panel assembly.
Figure 5:
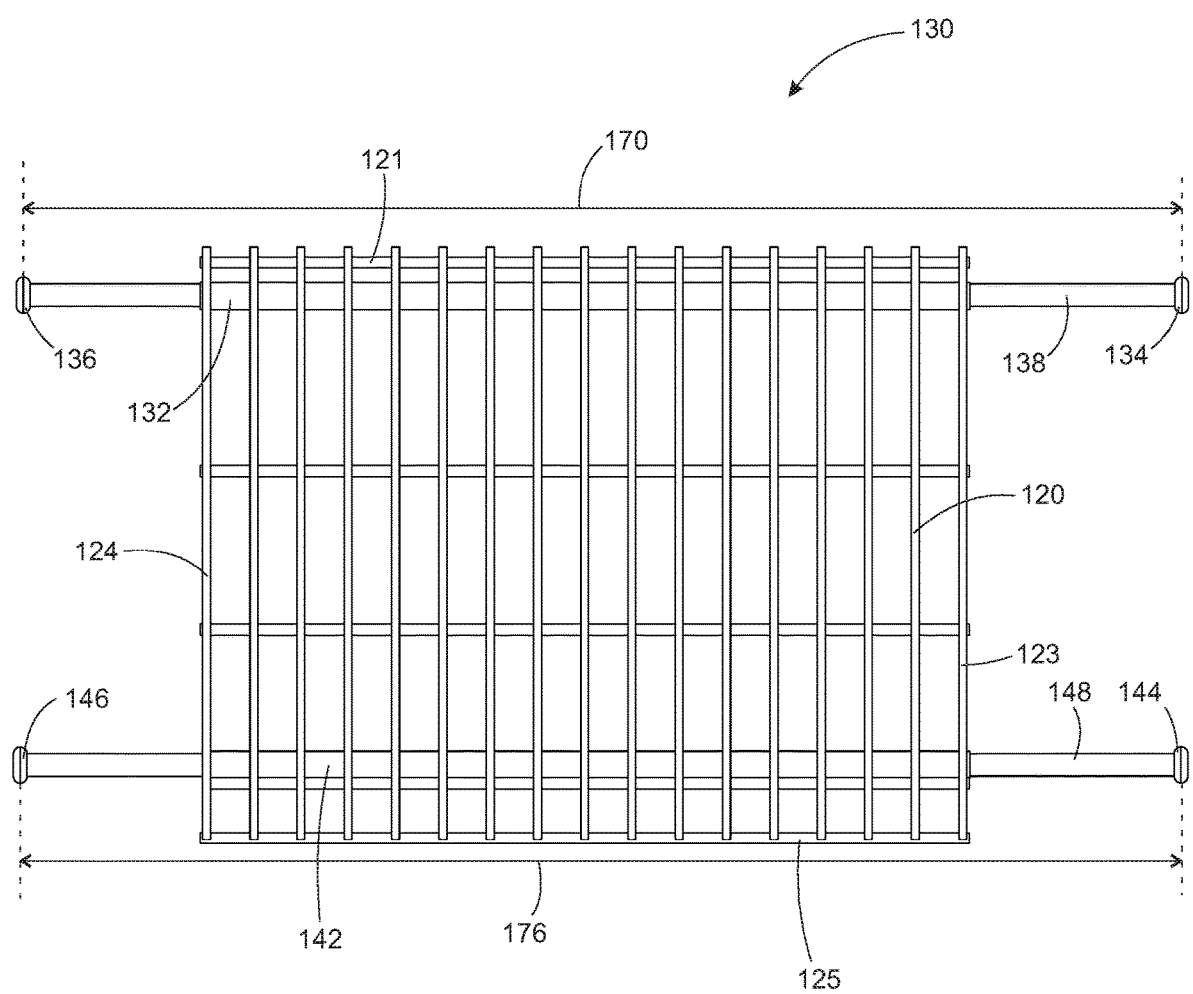
FIG. 5 shows a rear view of the front panel assembly of FIG. 4.
Figure 6:
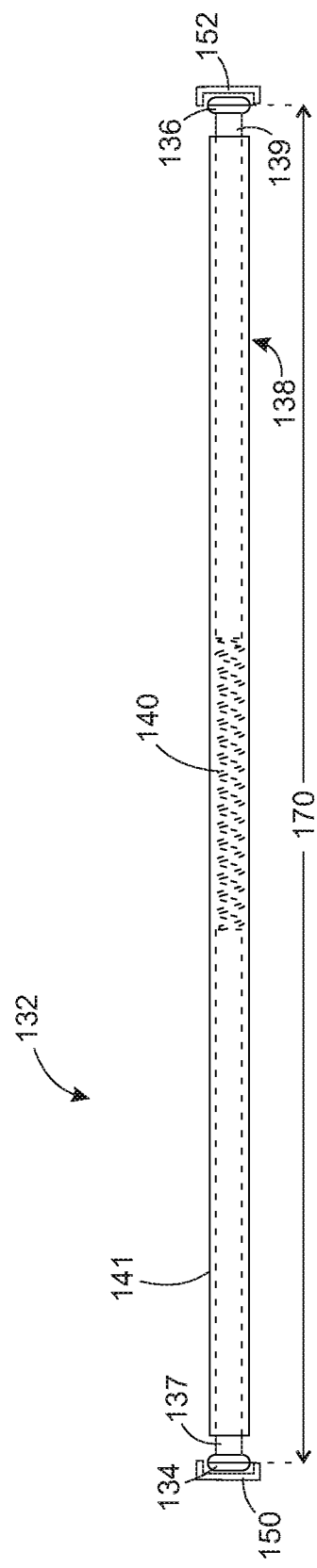
FIG. 6 shows a front view of a top wheel assembly.
Figure 7:
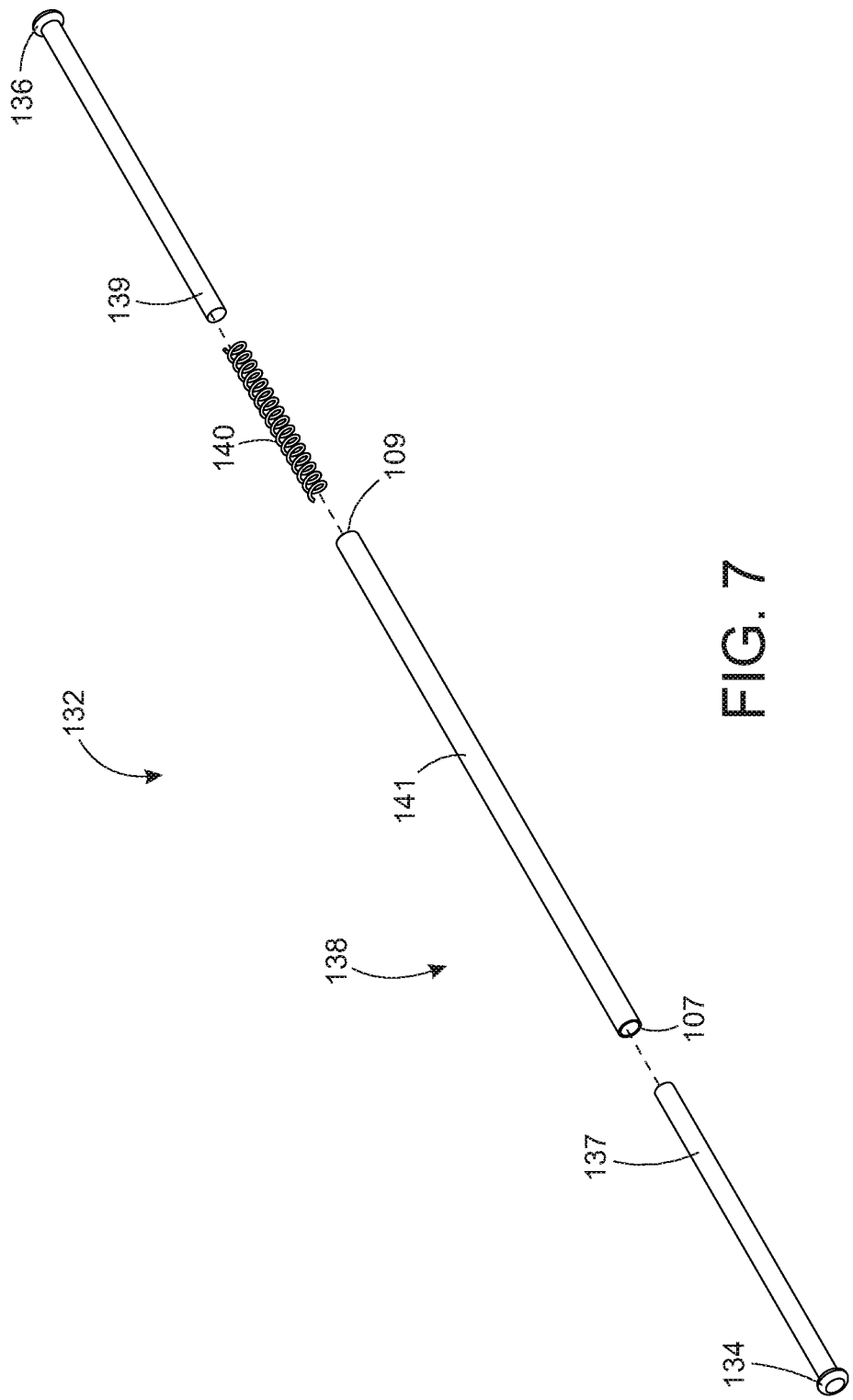
FIG. 7 shows an exploded view of the top wheel assembly of FIG. 6.

FIG. 4 through FIG. 7 show further details of front panel assembly 130. FIG. 4 shows a front view of front panel assembly 130. FIG. 5 shows a rear view of front panel assembly 130. FIG. 6 shows a front view of a top wheel assembly 132 of front panel assembly 130. FIG. 7 shows an exploded view of top wheel assembly 132.

Front panel assembly 130 includes a front panel 120, which is a grid of bars similar to the rest of shopping basket 112. Front panel 120 is a rectangular grid of bars with a top edge 121, a bottom edge 125, a first side edge 123 and a second side edge 124, as shown in FIG. 4 and FIG. 5. Front panel assembly 130 includes top wheel assembly 132 (see FIG. 5 and FIG. 6), which is coupled to front panel 120 near top edge 121. Top wheel assembly 132 includes first wheel 134, second wheel 136, and first wheel axle 138. First and second wheel 134 and 136 rotate on first wheel axle 138. Front panel assembly 130 also includes a bottom wheel assembly 142, which is coupled to front panel 120 near bottom edge 125. Bottom wheel assembly 142 includes third wheel 144, fourth wheel 146, and second wheel axle 148. Third and fourth wheel 134 and 136 rotate on second wheel axle 148.

First wheel 134 and third wheel 144 roll in first wheel track 150. First wheel track 150 has a C shaped cross section (see FIG. 6) which captures first and third wheel 134 and 144 and allows first and third wheel 134 and 144 to roll along first wheel track 150. First wheel track 150 includes a first wheel track top portion 151 that is coupled to first side panel 114 along a first side panel top edge 115, as shown in FIG. 3. First wheel track 150 also includes a first wheel track front portion 155 that is coupled to first side panel 114 along a first side panel front edge 126. First wheel track 150 also includes a first wheel track bottom portion 157 that is coupled to first side panel 114 along a first side panel bottom edge 128.

Second wheel 136 and fourth wheel 146 roll in second wheel track 152. Second wheel track 152 has a C shaped cross section (see FIG. 6) which captures second and fourth wheel 136 and 146 and allows second and fourth wheel 136 and 146 to roll along second wheel track 152. Second wheel track 152 includes a second wheel track top portion 153 that is coupled to second side panel 116 along a second side panel top edge 173, as shown in FIG. 1 through FIG. 3. Second wheel track 152 also includes a second wheel track front portion 156 that is coupled to second side panel 116 along a second side panel front edge 174. Second wheel track 152 also includes a second wheel track bottom portion 158 that is coupled to second side panel 116 along a second side panel bottom edge 175.

First wheel axle 138 and second wheel axle 148 are each spring-loaded so that their lengths are adjustable. This allows first wheel axle 138 and second wheel axle 148 to adjust to the changing spacing between first and second wheel tracks 150 and 152 as front panel assembly 130 slides along first and second wheels tracks 150 and 152. FIG. 4 shows a front view of front panel assembly 130, with first and second wheel axle 138 and 148 in a retracted position. FIG. 5 shows a rear view of front panel assembly 130, with first and second when axle 138 and 148 in an extended position.

FIG. 6 shows a front view of top wheel assembly 132, showing how first wheel axle 138 includes a spring 140. Spring 140 allows a length 170 of first wheel axle 138 to change as front panel assembly 130 slides along first and second wheel tracks 150 and 152. FIG. 7 shows an exploded view of top wheel assembly 132 with wheels 134 and 136 removed. Top wheel assembly 132 includes first wheel 134, second wheel 136, and first wheel axle 138. First wheel axle 138 includes a first axle rod 137 coupled to first wheel 134, and a second axle rod 139 coupled to second wheel 136. First and second axle rod 137 and 139 each slidingly insert into a sleeve 141, as shown in FIG. 6 and FIG. 7. First axle rod 137 slidingly inserts into a first end 107 of sleeve 141. Second axle rod 139 slidingly inserts into a second end 109 of sleeve 142. Spring 140 is inserted into sleeve 142 between first and second axle rod 137 and 139 so that first and second axle rod 137 and 139 are biased outward by spring 140, pushing first and second axle rod 137 and 139 out of sleeve 141, which moves first and second wheel 134 and 136 away from each other.

Bottom wheel assembly 142 includes second wheel axle 148, which is similarly spring-loaded with a second spring that biases third and fourth wheel 144 and 146 away from each other. As front panel assembly 130 slides along first and second wheel tracks 150 and 152, length 170 of top wheel assembly 132 and length 176 of bottom wheel assembly 142 automatically adjusts to fit the varying spacing between first and second wheel tracks 150 and 152 as spring 140 in first axle rod 137 and the second spring in second axle rod 139 extend and retract first and second wheel axle 138 and 148. The adjustable lengths 170 and 172 of top and bottom wheel assemblies 132 and 142 allows front panel assembly 130 to slide smoothly along first and second wheel tracks 150 and 152 as front panel assembly moves from default position 102 (FIG. 1) to first position 104 above shopping basket 112 and bottom panel 118 (FIG. 2) and to second position 106 below shopping basket 112 and bottom panel 118 (FIG. 3).

Figure 8:
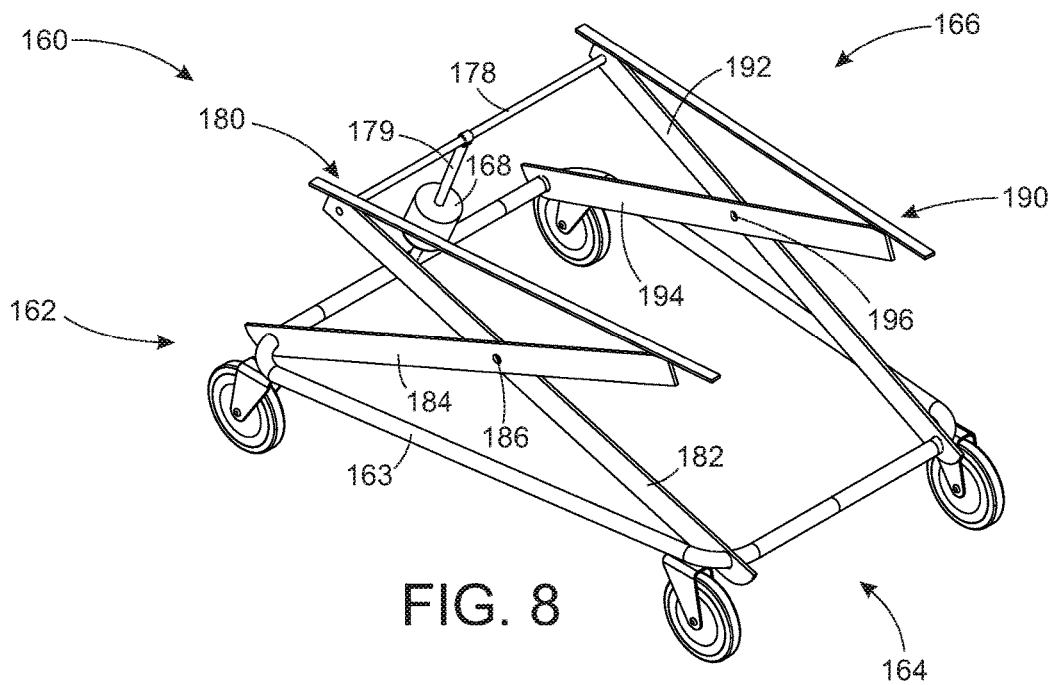
FIG. 8 shows a front perspective view of a support structure and wheel assembly of the shopping cart of FIG. 1.
Figure 9:
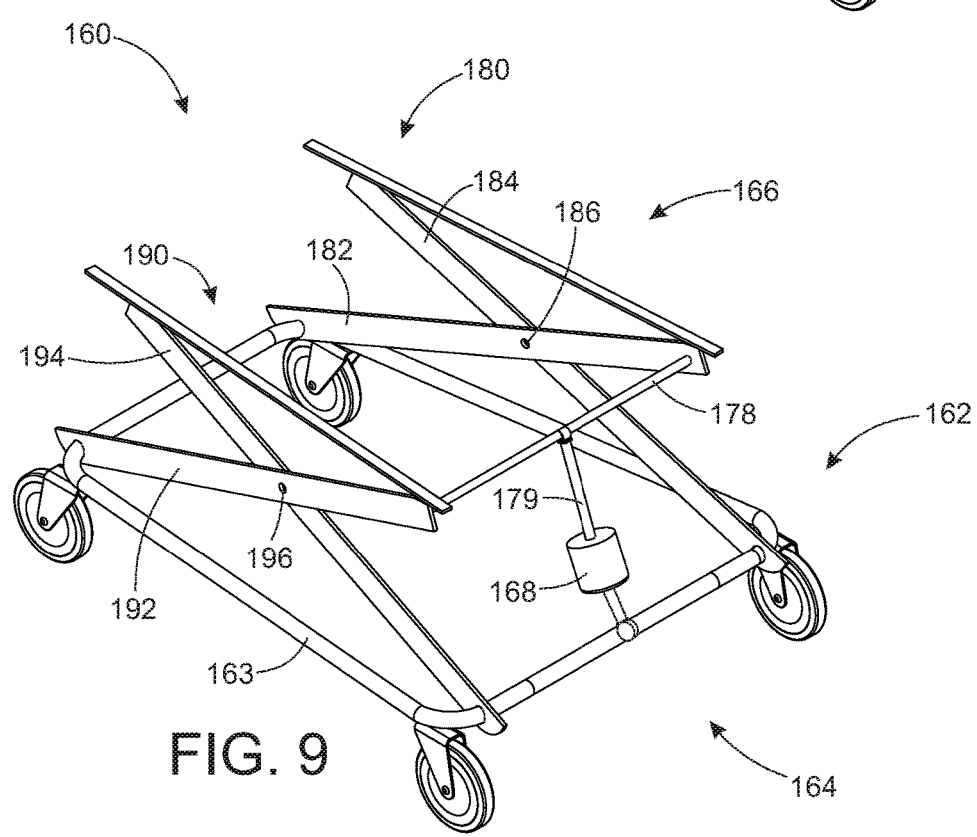
FIG. 9 shows a rear perspective view of the support structure and wheel assembly of FIG. 8.
Figure 10:
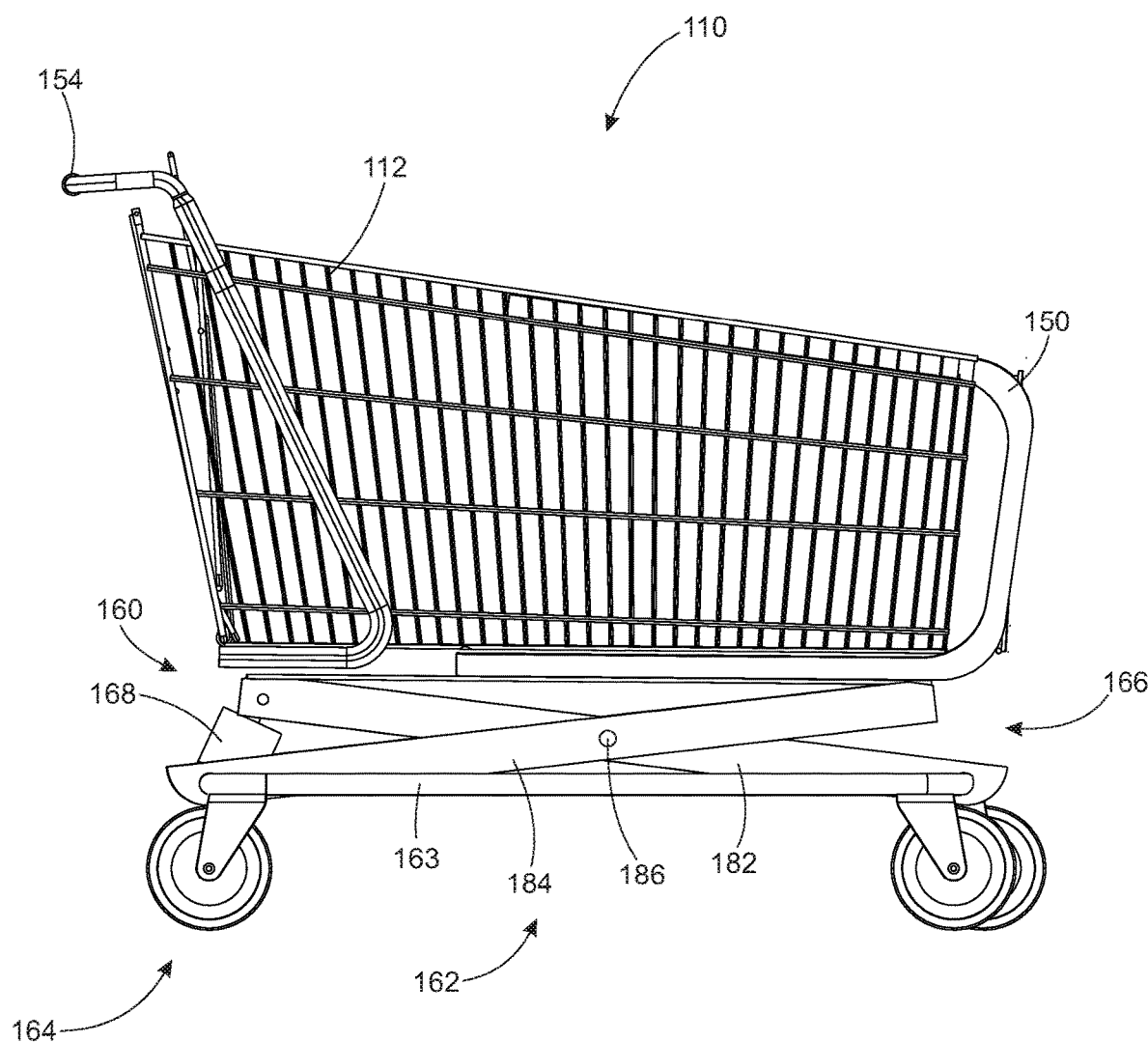
FIG. 10 shows a side view of the shopping cart of FIG. 1 in a lowered position.

Shopping cart basket 112 is supported by support structure 160 and wheel assembly 162. FIG. 8 through FIG. 11 show further details for support structure 160 and wheel assembly 162. FIG. 8 shows a front perspective view of support structure 160 and wheel assembly 162. FIG. 9 shows a rear perspective view of support structure 160 and wheel assembly 162. FIG. 10 shows a side view of shopping cart 110 with shopping basket 112 in the lowered position. FIG.

11 shows a side view of shopping cart 110 with shopping basket 112 in the raised position.

Wheel assembly 162 includes a set of wheels 164 coupled to a wheel frame 163, as can best be seen in FIG. 8 and FIG. 9. Shopping cart 110 rolls along a floor or other support surface on wheel assembly 162.

Support structure 160 couples shopping basket 112 to wheel assembly 162, and supports shopping basket 112 above wheel assembly 162.

Support structure 160 includes a lifting mechanism 166. Lifting mechanism 166 raises and lowers shopping basket 112 above wheel assembly 162, which increases or decreases the distance between wheel assembly 162 and shopping basket 112. Raising and lowering shopping basket 112 helps customers load and unload items into shopping basket 112.

Figure 11:
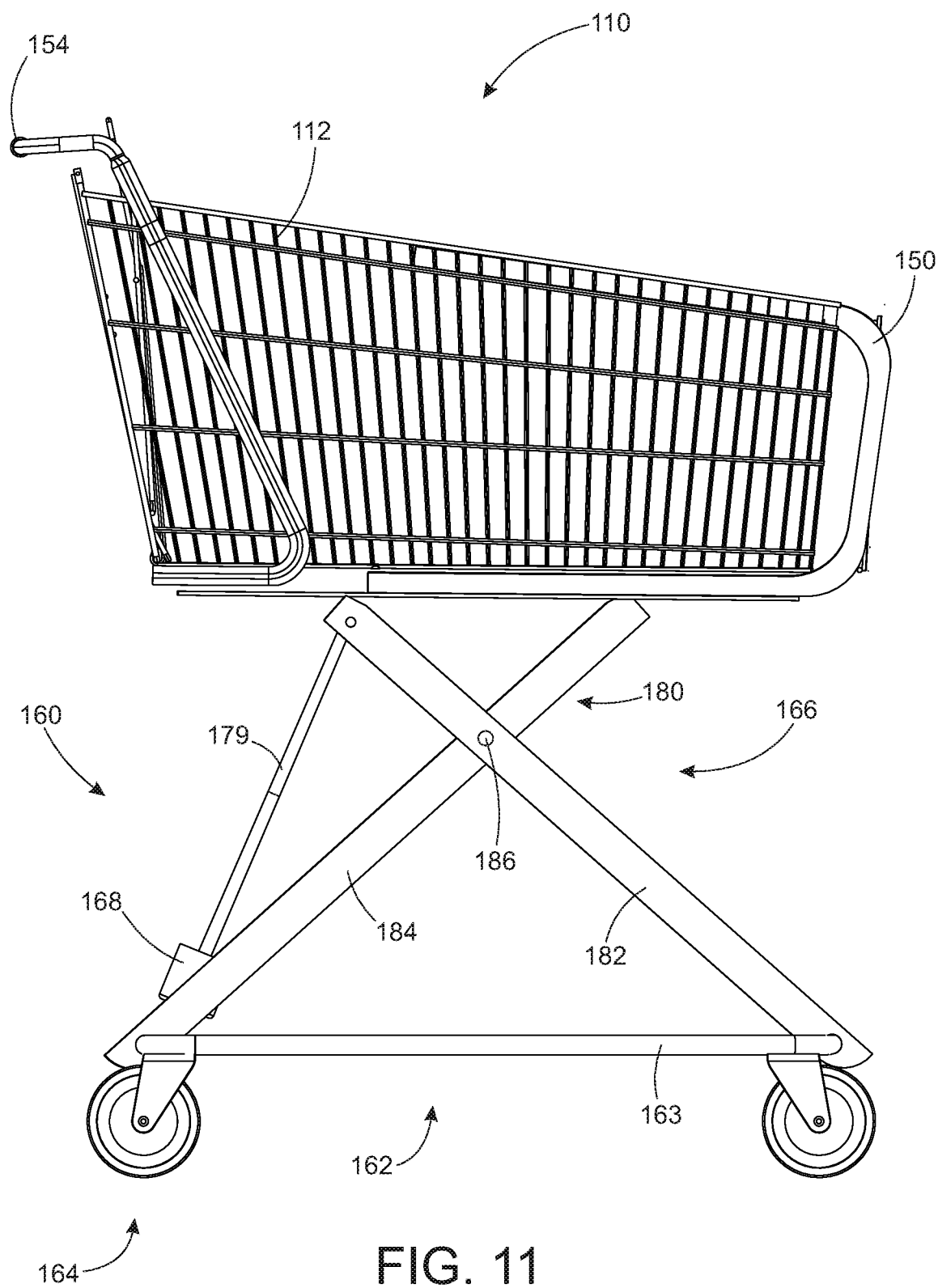
FIG. 11 shows a side view of the shopping cart of FIG. 1 in a raised position.

Lifting mechanism 166 includes a first scissor lift 180 and a second scissor lift 190, a support bar 178 coupled between first and second scissor lift 180 and 190, and a lift device 168, as shown in FIG. 8 and FIG. 9. Lift device 168 is a device that raises and lowers shopping basket 112, using pneumatic, hydraulic, or electric power, for example, but not by way of limitation. Lift device 168 is coupled to wheel assembly 162 and to support bar 178. Lift device 168 applies a force to support bar 178 using piston 179 to raise shopping basket 112 to a raised position, as shown in FIG. 11. Lift device 168 releases the force on support bar 178 to lower shopping cart 112 to a lowered position, as shown in FIG. 10. Piston 179 is driven by lift device 168, which can use many types of power drives to drive piston 179. In some embodiments, lift device 168 includes a hydraulic cylinder. In some embodiments, lift device 168 includes a pneumatic drive. In some embodiments, lift device 168 includes a linear actuator. In some embodiments, lift device 168 includes some other type of power device that drives raises and lowers support bar 178, which raises and lowers shopping basket 112.

First scissor lift 180 includes a first scissor lift bar 182 and a second scissor lift bar 184, rotatingly coupled at first rotation joint 186. Second scissor lift 190 includes a third scissor lift bar 192 and a fourth scissor lift bar 194, rotatingly coupled at second rotation joint 196. First and second scissor lift 180 and 190 move in a scissor-like fashion as lift device 168 raises and lowers shopping basket 112, as shown in FIG. 10 and FIG. 11. First scissor lift 180 is coupled to first side panel 114 and wheel assembly 162. Second scissor lift 190 is coupled to second side panel 116 and wheel assembly 162. Lift device 168 is coupled to wheel assembly 162 and support bar 178.

Lift device 168 extends piston 179 to push support bar 178 and shopping basket 112 up, as shown in FIG. 11. Lift device 168 retracts piston 179 to lower support bar 178 and shopping basket 112, as shown in FIG. 10. Lift device 168 is controlled by the user of shopping cart 110. Lift device 168 can have hand controls near handle 154, for example, or foot controls. In some embodiments, lift device 168 is control by a remote control device.

Lifting mechanism 166 allows shopping cart basket 112 to be raised and lowered. Front panel assembly 130 slides on tracks to slide front panel assembly 130 out of the way so that items can be moved into and out of shopping basket 112 through the front side. The capability to raise and lower shopping basket 112 and slide front panel assembly 130 out of the way gives a customer using shopping cart 110 numerous options to help load and unload shopping cart 110.

Figure 12:
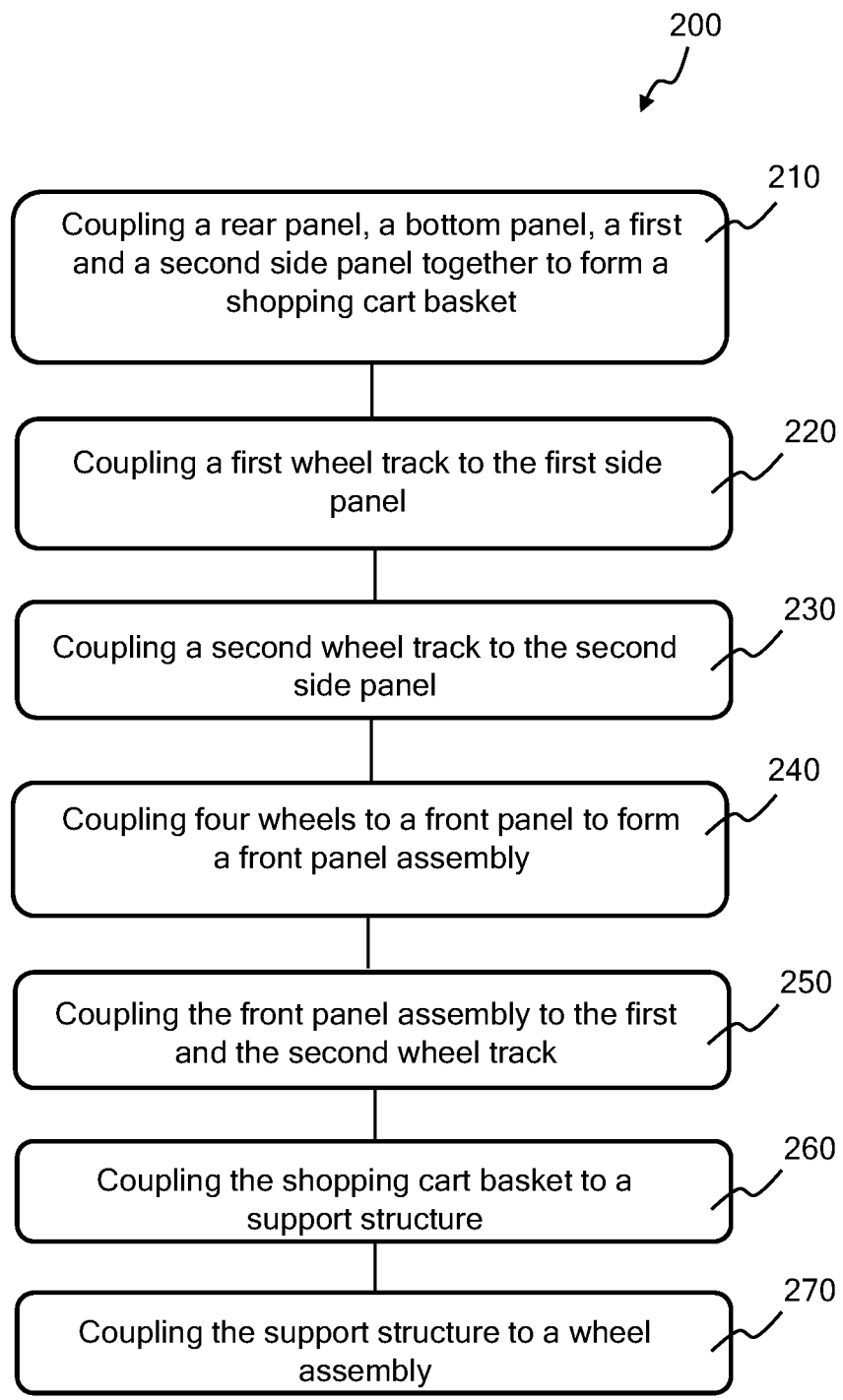
FIG. 12 illustrates a method of forming a shopping cart.

FIG. 12 illustrates a method 200 of forming, or assembling, a shopping cart. Method 322 includes an act 210 of coupling a rear panel, a bottom panel, a first side panel, and a second side panel together to form a shopping basket. The shopping basket is a part of the shopping cart. The shopping cart is used to carry items in a retail store. Method 200 also includes an act 220 of coupling a first wheel track to the first side panel, and an act 230 of coupling a second wheel track to the second side panel. The first and the second wheel tracks are used to carry a wheeled front panel assembly. Method 200 includes an act 240 of coupling a first wheel, a second wheel, a third wheel, and a fourth wheel to a front panel to form a front panel assembly.

Method 200 also includes an act 250 of coupling the front panel assembly to the first and the second wheel track, where the first, second, third and fourth wheels roll on the first and the second wheel track to move the front panel assembly from a first position above the shopping basket to a second position below the shopping basket. Method 200 also includes an act 260 of coupling the shopping basket to a support structure, and an act 270 of coupling the support structure to a wheel assembly. The wheel assembly includes the wheels of the shopping cart. The support structure supports the shopping basket above the wheel assembly.

In some embodiments, act 240 of coupling the first wheel, the second wheel, the third wheel, and the fourth wheel to the front panel to form the front panel assembly includes coupling the first and the second wheel to a first wheel axle to form a top wheel assembly. In some embodiments, the first wheel axle has an adjustable first axle length. In some embodiments, act 240 of coupling the first wheel, the second wheel, the third wheel, and the fourth wheel to the front panel to form the front panel assembly includes coupling the third and the fourth wheel to a second wheel axle to form a bottom wheel assembly. In some embodiments, the second wheel axle has an adjustable second axle length. In some embodiments, act 240 of coupling the first wheel, the second wheel, the third wheel, and the fourth wheel to the front panel to form the front panel assembly includes coupling the top wheel assembly and the bottom wheel assembly to the front panel to form the front panel assembly. In some embodiments, act 250 of coupling the front panel assembly to the first and the second wheel track includes coupling the first and the third wheel to the first wheel track. In some embodiments, act 250 of coupling the front panel assembly to the first and the second wheel track includes coupling the second and the fourth wheel to the second wheel track. The front panel assembly serves as the front piece of the shopping basket, but rolls on its wheels and the wheel tracks to move out of the way so items can be moved into and out of the shopping basket through the front portion. The front panel assembly rolls on the first and second wheel track to positions above or below the shopping basket and the bottom panel. This leaves the front side of the shopping basket open so items can be slid or moved into and out of the shopping basket through the front side instead of having to lift items over the sides of the shopping basket to get them into and out of the shopping basket. Being able to move the front panel assembly out of the way makes it much easier for customers to load and unload the shopping cart.

In some embodiments, act 260 of coupling the shopping cart basket to the support structure includes coupling a first scissor lift to the first side panel and the wheel assembly. In some embodiments, act 260 of coupling the shopping cart basket to the support structure includes coupling a second scissor lift to the second side panel and the wheel assembly. In some embodiments, act 260 of coupling the shopping cart basket to the support structure includes coupling a support bar between the first scissor lift and the second scissor lift.

In some embodiments, act 260 of coupling the shopping cart basket to the support structure includes coupling a lift device to the support bar and the wheel assembly. The lift device raises and lowers the shopping cart basket. Raising and lowering the shopping cart basket makes it easier for customers to load and unload items into the shopping cart.

The lift device can include many different types of power sources. In some embodiments, the lift device includes a hydraulic cylinder. In some embodiments, the lift device includes a pneumatic piston. In some embodiments, the lift device includes a linear actuator. Any of these devices or others can be used to provide power to raise and lower the shopping basket by raising and lowering the support bar above the wheel assembly. By raising and lowering the support bar, the shopping basket, which is coupled to the wheel assembly with the scissor lifts, is raised and lowered.

A shopping cart has been shown and described with features that make it easier for a customer to load and unload items into the shopping cart and the shopping basket. The shopping cart has a shopping basket with a front panel assembly that allows the front panel to slide out of the way to positions above or below the shopping basket. This makes it easy to slide items into or out of the shopping basket. The shopping cart includes a lift mechanism that raises and lowers the shopping basket, allowing the customer to raise and lower the shopping basket to a height where items can be easily loaded or unloaded.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A shopping cart comprising:
   a shopping basket having a first and a second side panel, a bottom panel, a rear panel, and a front panel assembly, wherein the front panel assembly comprises:
   a front panel;
   a top wheel assembly coupled to the front panel, wherein the top wheel assembly comprises a first and a second wheel coupled to a first wheel axle; and
   a bottom wheel assembly coupled to the front panel, wherein the bottom wheel assembly comprises a third and a fourth wheel coupled to a second wheel axle;
   a first wheel track coupled to the first side panel, wherein the first and the third wheel roll along the first wheel track to move the front panel from a first position above the bottom panel to a second position below the bottom panel;
   a second wheel track coupled to the second side panel, wherein the second and the fourth wheel roll along the second wheel track to move the front panel from the first position above the bottom panel to the second position below the bottom panel;
   a handle coupled to the shopping basket;
   a support structure coupled to the shopping basket; and
   a wheel assembly coupled to the support structure, wherein the wheel assembly comprises a set of wheels.

2. The shopping cart of claim 1, wherein the first wheel axle has an adjustable first wheel axle length.

3. The shopping cart of claim 2, wherein the first wheel axle comprises:
   a first axle rod coupled to the first wheel;
   a second axle rod coupled to the second wheel;
   a sleeve, wherein the first and the second axle rod are slidingly inserted into the sleeve, and
   a spring positioned inside the sleeve between the first and the second axle rod.

4. The shopping cart of claim 3, wherein the first axle rod is slidingly inserted into a first end of the sleeve and wherein the second axle rod is slidingly inserted into a second end of the sleeve.

5. The shopping cart of claim 1, wherein the first wheel track has a C shaped cross section.

6. The shopping cart of claim 1, wherein the first wheel track comprises a first wheel track top portion that is coupled to a first side panel top edge, a first wheel track front portion that is coupled to a first side panel front edge, and a first wheel track bottom portion that is coupled to a first side panel bottom edge.

7. The shopping cart of claim 6, wherein the second wheel track comprises a second wheel track top portion that is coupled to a second side panel top edge, a second wheel track front portion that is coupled to a second side panel front edge, and a second wheel track bottom portion that is coupled to a second side panel bottom edge.

* * * * *